US008329082B2

(12) United States Patent
Borchert et al.

(10) Patent No.: US 8,329,082 B2
(45) Date of Patent: Dec. 11, 2012

(54) PROCEDURE FOR PRODUCING HOLLOW BODIES OF THERMOPLASTIC MATERIAL

(75) Inventors: Matthias Borchert, Bonn (DE); Gerd Wolter, Konigswinter (DE); Harald Lorenz, Bad Neuenahr-Ahrweiler (DE); Dirk Eulitz, Bonn (DE); Timo Kramer, Hirz-Maulsbach (DE); Markus Hutzen, Waldbrol/Hermesdorf (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 12/897,925

(22) Filed: Oct. 5, 2010

(65) Prior Publication Data

US 2011/0016698 A1 Jan. 27, 2011

Related U.S. Application Data

(62) Division of application No. 11/774,134, filed on Jul. 6, 2007, now Pat. No. 7,922,949.

(60) Provisional application No. 60/806,750, filed on Jul. 7, 2006.

(51) Int. Cl.
*B29C 44/00* (2006.01)
(52) U.S. Cl. ........ 264/250; 264/299; 264/319; 264/320; 264/515; 264/516; 264/545; 156/244.13; 156/285
(58) Field of Classification Search ............... 156/285, 156/244.13, 244.19; 264/515, 516, 250, 264/545, 299, 319, 320

See application file for complete search history.

(56) References Cited

U.S. PATENT DOCUMENTS 4,719,072 A * 1/1988 Kojima et al. ............... 264/515
5,326,514 A * 7/1994 Linden et al. ............... 264/83
6,138,857 A   10/2000 Keller
(Continued)

FOREIGN PATENT DOCUMENTS
DE    4315838    11/1994
(Continued)

OTHER PUBLICATIONS

PCT Search Report dated Oct. 15, 2007 received in corresponding International Application No. PCT/EP07/05152, 5 pages.

*Primary Examiner* — Christopher Schatz
(74) *Attorney, Agent, or Firm* — Grossman Tucker Perreault & Pfleger, PLLC (57) ABSTRACT

The invention concerns a process for the production of hollow bodies of thermoplastic material, in particular a process for the production of fuel tanks of plastic material. In the process according to the invention preforms in web or band form of plasticized plastic material are shaped in a multi-part tool forming a mold cavity by expansion of the preforms and causing them to bear against the internal contour of the mold cavity. The process firstly includes the production of two mutually complementary intermediate products in the form of shell portions. Then respective built-in fitment components are secured to the respective insides of the shell portions, which face towards each other in the installation position, wherein at least some built-in fitment components of mutually complementary shell portions are respectively of mutually complementary configuration, in the sense that they can be joined to provide an assembled component or to provide a functional unit. The shell portions are assembled in such a way that the mutually complementary built-in fitment components engage into each other and/or come into operative connecting relationship with each other.

11 Claims, 11 Drawing Sheets

U.S. PATENT DOCUMENTS

| | | |
|---|---|---|
| 6,857,534 B1 | 2/2005 | Keller |
| 6,978,802 B2 | 12/2005 | Hagano et al. |
| 2002/0095014 A1 | 7/2002 | Fottinger |
| 2002/0105115 A1 | 8/2002 | Sadr |
| 2002/0125254 A1 | 9/2002 | Hagano et al. |
| 2003/0164572 A1 | 9/2003 | Pappert et al. |
| 2006/0141184 A1 | 6/2006 | Rohde |

FOREIGN PATENT DOCUMENTS

| | | |
|---|---|---|
| DE | 10010900 | 9/2001 |
| DE | 10205524 | 8/2003 |
| DE | 10231866 | 1/2004 |
| DE | 60218237 | 10/2007 |
| EP | 1006014 | 11/1999 |
| EP | 1184157 | 3/2002 |
| EP | 1238845 | 3/2002 |
| EP | 1334817 | 1/2003 |
| EP | 1759827 A1 * | 3/2007 |
| GB | 2176448 | 12/1986 |
| JP | 2003-251684 | 9/2003 |
| WO | 2005/118255 | 12/2005 |
| WO | 2006064004 | 6/2006 |

* cited by examiner

PROCEDURE FOR PRODUCING HOLLOW BODIES OF THERMOPLASTIC MATERIAL

CROSS-REFERENCE TO RELATED APPLICATIONS

This application is a divisional application of U.S. Ser. No. 11/774,134, filed Jul. 6, 2007, and claims priority to U.S. Provisional Application 60/806,750, filed Jul. 7, 2006.

FIELD

The invention concerns a process for the production of hollow bodies of thermoplastic material.

BACKGROUND

The invention concerns in particular a process for the extrusion blow moulding of thermoplastic material to form integral hollow bodies, in particular fuel tanks of plastic material for motor vehicles.

It is basically known for extrusion blow moulding of hollow bodies to be effected by means of extrudates in web or band form. They can be obtained for example by the extrusion of a tubular preform which was cut up or divided into bands or webs. The extrusion of extrudates in web and band form without implementing the roundabout route of using the tubular form is also known. The preforms are either removed at the extruder by means of a manipulator and fed to the tool or they are extruded directly between the opened portions of a tool.

In the production of fuel tanks or other relatively large containers which are provided with built-in fitment components and attachments, the procedure involved is normally such that a tubular preform is extruded in a hanging condition, in the form of a multi-layer extrudate, either continuously or discontinuously, wherein after being expelled to the predetermined length the extrudate is shaped directly within a tool formed from two blow moulding mould halves. Expansion of the preform is effected by the preform being subjected to the action of gas pressure within the closed blow moulding mould.

If built-in fitment components such as for example surge components, fuel pumps, senders, roll pots and the like are to be fitted in the fuel tank, either they can be fitted by the plastic material being blow moulded therearound in production of the hollow body or they can be subsequently fitted into the finished container through assembly openings on the container. The latter procedure is less desirable for various reasons. More specifically, for emission reasons, openings and cut-out orifices in the container wall should be as far as possible avoided or kept as small as possible. In addition the manual assembly expenditure on a fuel tank produced in that way is comparatively high.

The operation of introducing such built-in fitment components is found to be particularly difficult when the fuel tank is comparatively rugged and irregular, that is to say it is of a complex spatial configuration.

Therefore, as an alternative to integral containers which are produced by extrusion blow moulding, the possibility is known for producing such containers, for example fuel tanks, from two injection-moulded or deep-drawn half-shell portions. That procedure affords the advantage that built-in fitment components can be fitted into the opened half-shell portions. The two half-shell portions are then welded together to produce the closed container. In that case the operation of assembling built-in fitment components can be very substantially automated. A problem with fuel tanks which are produced in that way is the weld seams at the connecting locations of the half-shell portions. They represent potential leakage locations on the container for gaseous hydrocarbons and require additional devices for making the welded connections.

In principle there would also be the possibility of placing built-in fitment components in the interior of a container when producing containers by extrusion blow moulding of two or more preforms in web or band form, by means of suitable manipulators. It will be noted however that this is relatively complicated and expensive if the situation involves introducing into the container fitment components which extend over the overall cross-section of the container or which indeed are intended to join the mutually oppositely disposed inside walls of the container together. In that respect the procedure that presents itself for that purpose is to assemble the containers from half-shell portions which are prefabricated, for example injection-moulded or deep-drawn.

The object of the invention is therefore that of providing a novel process for the production of hollow bodies of thermoplastic material by extrusion blow moulding of preforms in web or band form, in which built-in fitment components can be placed in the container, at a particularly low level of assembly complication and expenditure. In particular the invention seeks to provide that the process minimises manual and machine finishing working on a container provided with built-in fitment components.

SUMMARY

That object is attained by a process for the production of hollow bodies of thermoplastic material, in particular by a process for the production of fuel tanks of plastic material, in which preforms in web or band form of plasticised plastic material are shaped in a multi-part tool forming a mould cavity by expansion of the preforms and causing them to bear against the internal contour of the mould cavity, wherein the process firstly includes the production of two mutually complementary intermediate products in the form of shell portions, at least one respective built-in fitment component is secured to the respective insides of the shell portions, which face towards each other in the installation position, wherein at least some built-in fitment components of mutually complementary shell portions are respectively of mutually complementary configuration, in the sense that they can be joined to provide an assembled component or to provide a functional unit, and in addition the shell portions are assembled in such a way that the mutually complementary built-in fitment components engage into each other and/or come into operative connecting relationship with each other.

The invention can be summarised to the effect that, in the extrusion blow moulding of hollow bodies from bands or webs of a thermoplastic extrudate, during the operation of shaping out the hollow body or during the step of moulding the extrudates in web form, built-in fitment components are fitted into the shell portions respectively forming intermediate products, wherein the fitment components are so positioned and are of such a nature that, when the shell portions are brought together, the fitment components engage into each other and are brought into operative connecting relationship with each other in such a way that a spatially complex arrangement of almost any configuration of fitment components over the entire cross-section of the finished container is possible.

It is particularly desirable if the steps of producing and joining the shell portions are effected in the first heat, that is to say without further heating of the preforms.

In that way it is possible for example for bracing strut structures, surge fitments or lines to be fitted into the container in a particularly simple manner, wherein the latter can extend over the entire cross-section of the container. Bracing strut structures serve for example to counteract deformation of the container because of an increased pressure or a reduced pressure.

The container walls can also be joined together by way of bracing strut structures, without the need for that purpose to produce wall-to-wall welds by means of corresponding slider members in the tool.

The container can be equipped in that way exclusively by means of additional built-in fitment components in the container. The design configuration of the tools can turn out to be correspondingly simpler, for example it is possible in that way to avoid the need for slider members.

Preferably the preforms are shaped in a multi-part mould tool which includes at least two outer moulds and at least one central mould which perform an opening and closing movement relative to each other, wherein the outer moulds respectively form the sub-cavities which predetermine the contours of the shell portions and the central mould is provided with at least one component holder, in relation to which the fitment components are placed or fixed at the insides of the shell portions, after the operation of shaping the shell portions.

In an embodiment of the invention it is provided that the central mould is removed after placement of the built-in fitment components between the outer moulds and then the outer moulds are closed against each other in such a way that the shell portions and at least some of the fitment components arranged therein come into operative connecting relationship with each other.

By way of example bracing strut elements for stabilising the hollow body can be used as the mutually complementary built-in fitment components, the bracing strut elements latching together when the half-shell portions are joined together.

Alternatively holding elements can be used as mutually complementary built-in fitment components, which holding elements respectively receive couplings of electric lines and fluid lines, wherein the arrangements respectively including a holding element and a line portion with coupling are placed on the inside of the shell portions in such a way that the couplings engage into each other when the shell portions are joined together.

It is also possible to use surge fitment components, preferably in the form of surge walls or surge wall arrangements which engage into each other as mutually complementary built-in fitment components.

DESCRIPTION OF THE DRAWINGS

The invention is described hereinafter by means of two embodiments by way of example with reference to the accompanying drawings in which.

DETAILED DESCRIPTION

FIGS. 1 to 12 diagrammatically show the tool identified by reference 1 in cross-section during various phases in the process according to the invention. The tool identified by reference 1 in the Figures is of a three-part nature and comprises two outer moulds 2a, 2b and a central mould 3. The outer moulds 2a, 2b are displaceable away from and towards each other in the sense of an opening and closing movement. The central mould 3 is displaceable with respect to the outer moulds 2a, 2b transversely with respect to the opening and closing movement of the outer moulds 2a, 2b. The moulds are each fixed in per se known manner to respective known mould mounting plates which are not shown here for the sake of simplicity. The mould mounting plates are slidable or displaceable in a closing frame structure which is also not shown. An extrusion device for producing preforms 8 in web or band form is also illustrated only by way of indication, for reasons of simplification. By way of example, referring to FIG. 1, two suitable extrusion heads with wide-slot nozzles can be arranged above the tool 1 outside the plane of the drawing, on the side which is towards the person viewing the drawing. It is equally possible for a preform in tube form to be divided up into two webs by suitable tools during or immediately after extrusion and for those webs to be fed to the tool 1 by means of a manipulator.

Figure 1:
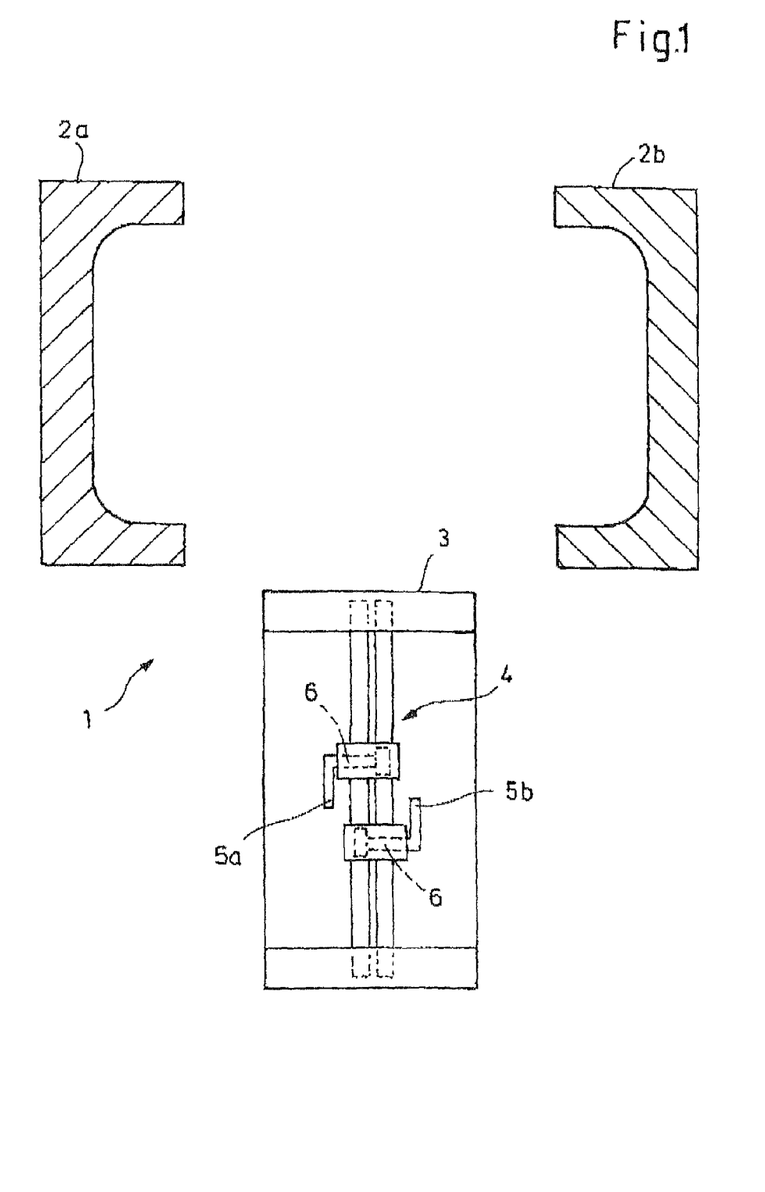
FIGS. 1 to 12 show diagrammatic views of the individual steps in the production process.
Figure 2:
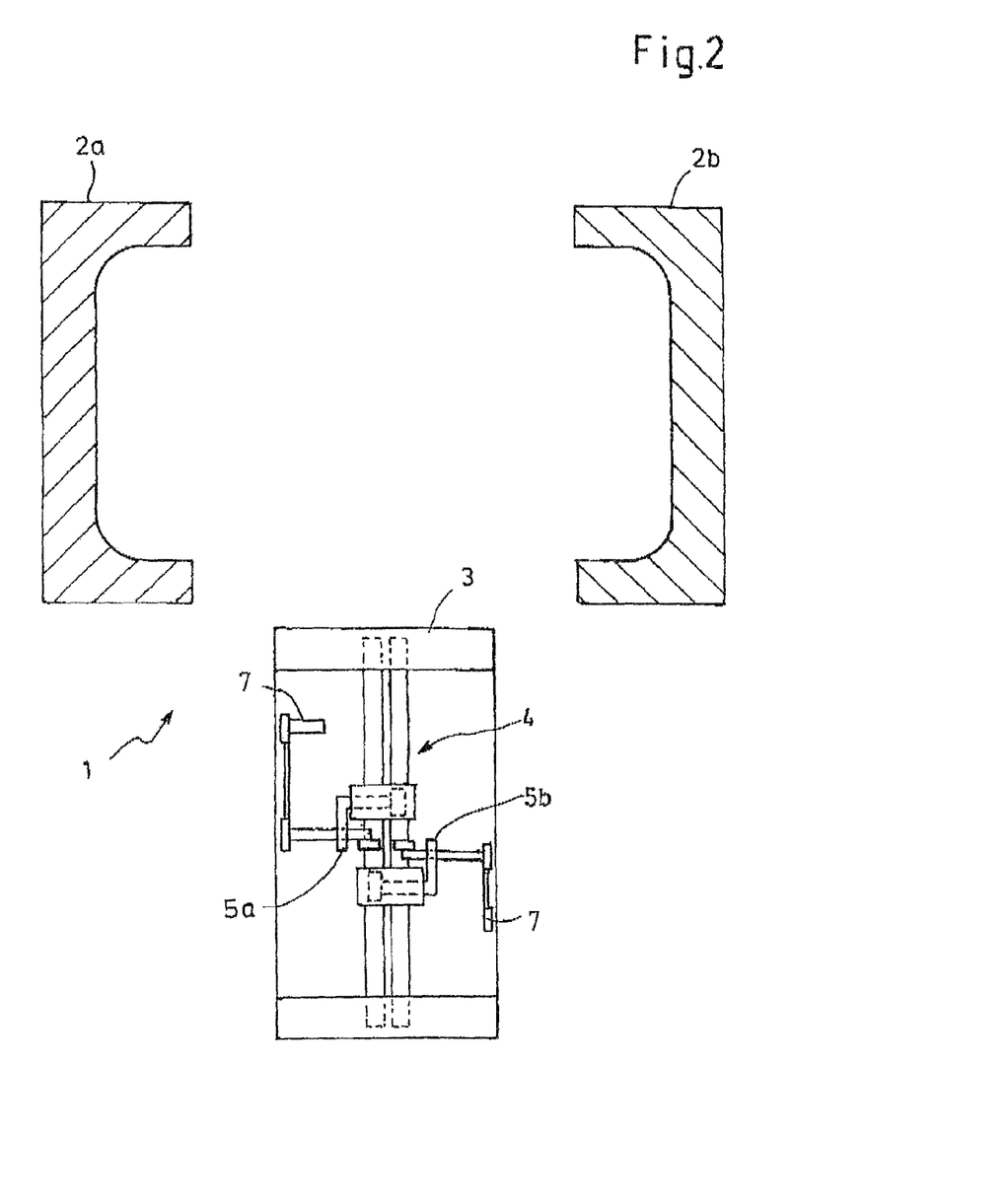
Figure 3:
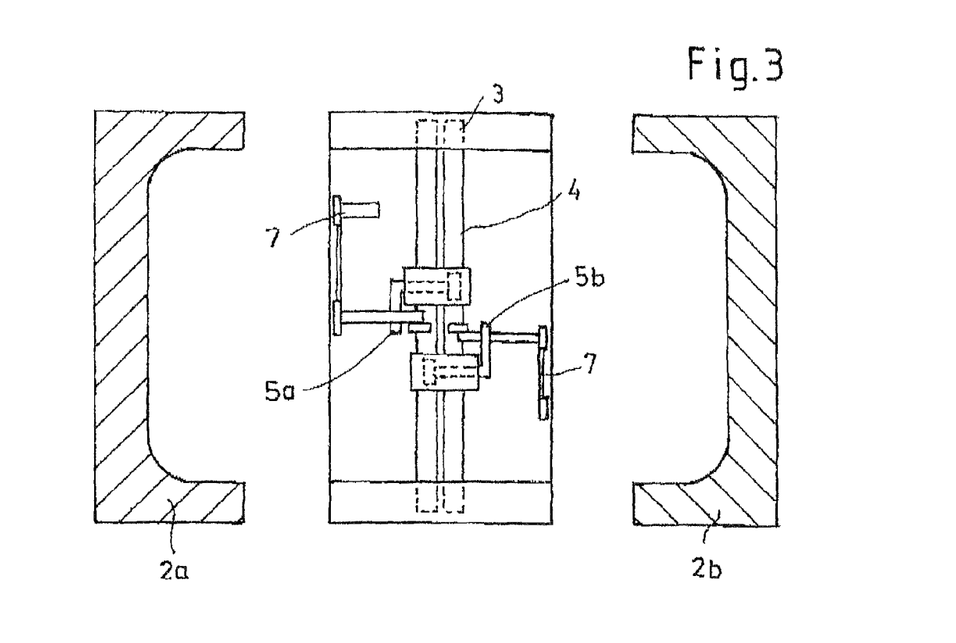
Figure 4:
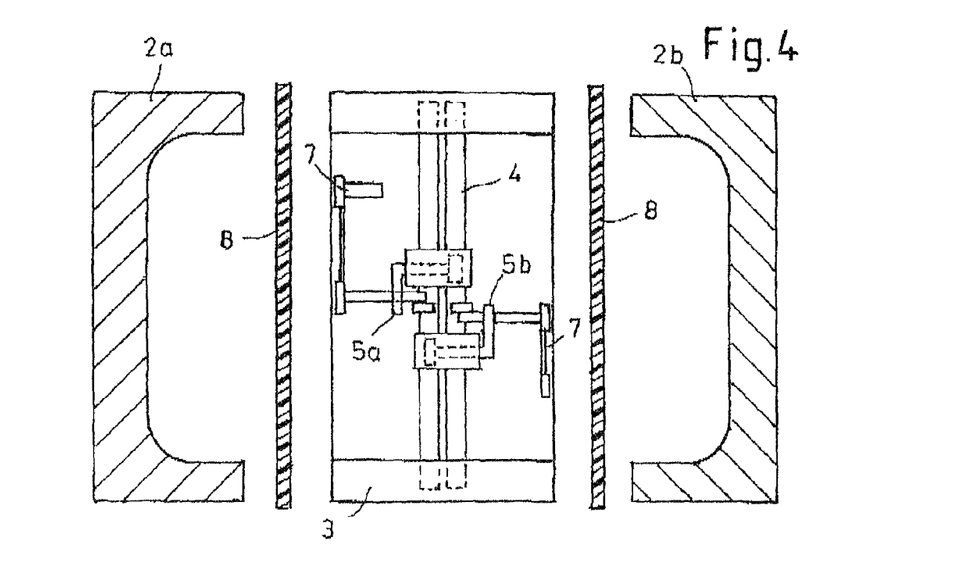
Figure 5:
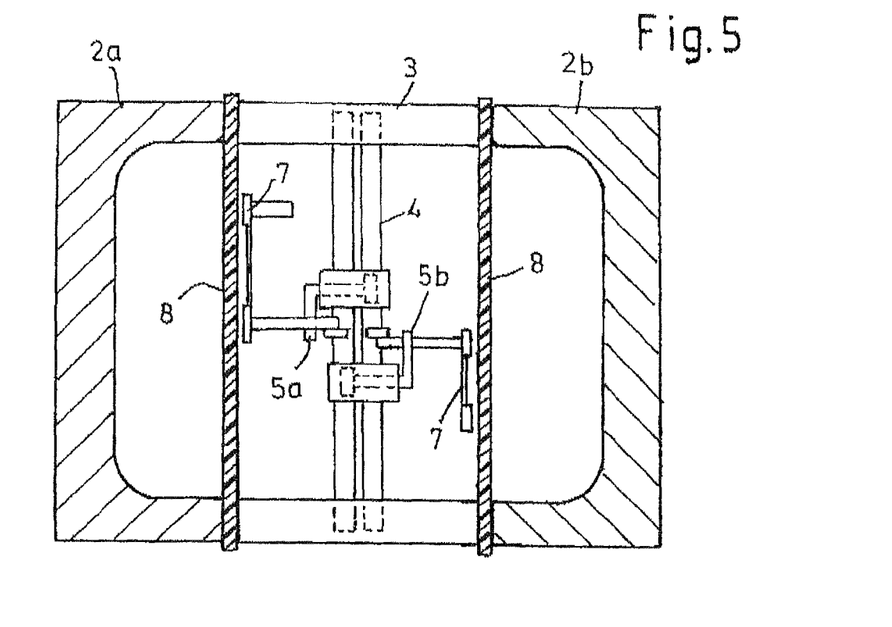
Figure 6:
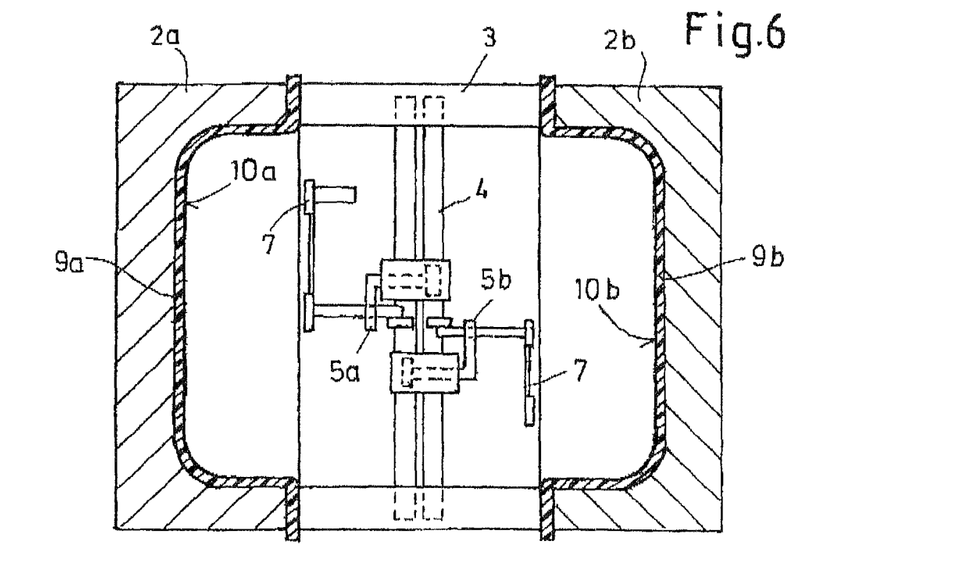

Arranged within the central mould 3 is a carrier 4 which, in the illustrated embodiment, for the sake of simplicity, carries only two displaceable component holders 5a, 5b which are displaceable with respect to the carrier 4 by way of pneumatic cylinders 6. The use of hydraulic cylinders is alternatively possible.

In the view shown in FIG. 1 the central mould 3 is in the outwardly displaced position, displaced transversely with respect to the opening and closing movement of the outer moulds 2a, 2b, the opening and closing movement of the outer molds 2a, 2b being displaceable away from or towards one another. In that position the component holder 5a, 5b is fitted with built-in fitment components 7 (see FIG. 2). In a further step in the process the central mould 3 is moved between the outer moulds 2a, 2b. See FIG. 3. Two preforms 8 in web form are then respectively introduced between the central mould 3 and the outer moulds 2a, 2b which are in an open position relative to each other. See FIG. 4. As already mentioned in the opening part of this specification, that can be effected by extrusion from wide-slot nozzles arranged above the tool 1, that is to say above the plane of the drawing in the Figures. As an alternative thereto it is possible for the extruder or extruders to be arranged spatially remote from the tool 1 and for the extrudates or preforms 8 to be transported between the opened portions of the tool 1 by means of a suitable gripper.

For the production of a fuel tank it is provided for example that the preforms 8 each comprise a six-layer co-extrudate with barrier layers for hydrocarbons. A suitable barrier material is for example EVOH (ethylene vinyl alcohol copolymer).

As soon as the preforms are arranged at the desired length between the outer moulds 2a, 2b and the central mould 3 respectively the outer moulds 2a, 2b are closed with respect to the central mould 3. See FIG. 5. The preforms 8 are then expanded by means of the action of gas under pressure in the mould cavity (see FIG. 6) so that they are each caused to bear against the sub-cavities 9a, 9b of the tools 2a, 2b.

Figure 7:
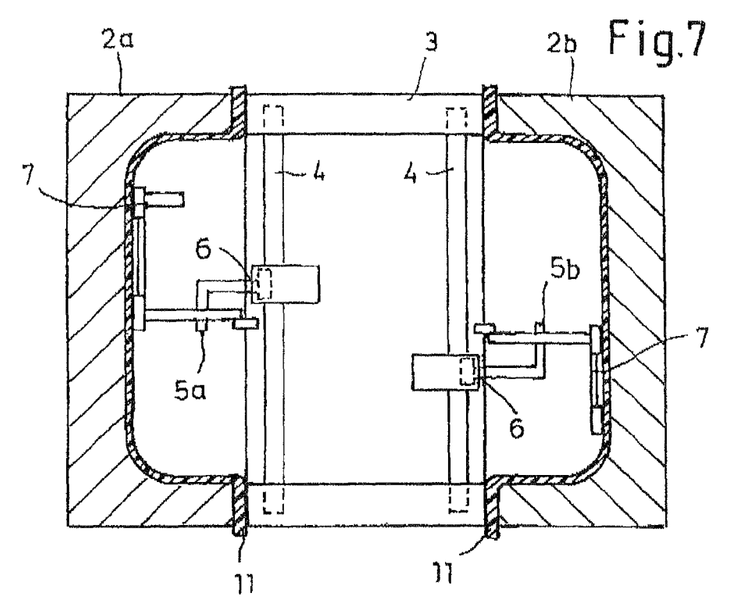
Figure 8:
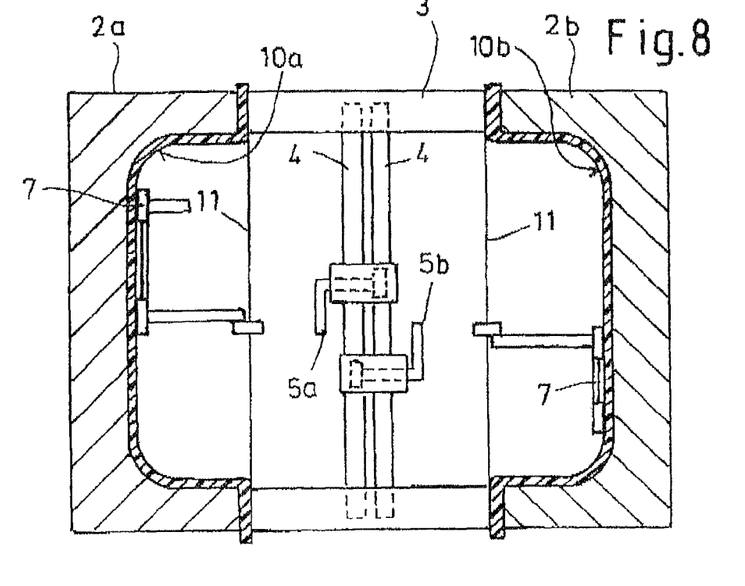
Figure 9:
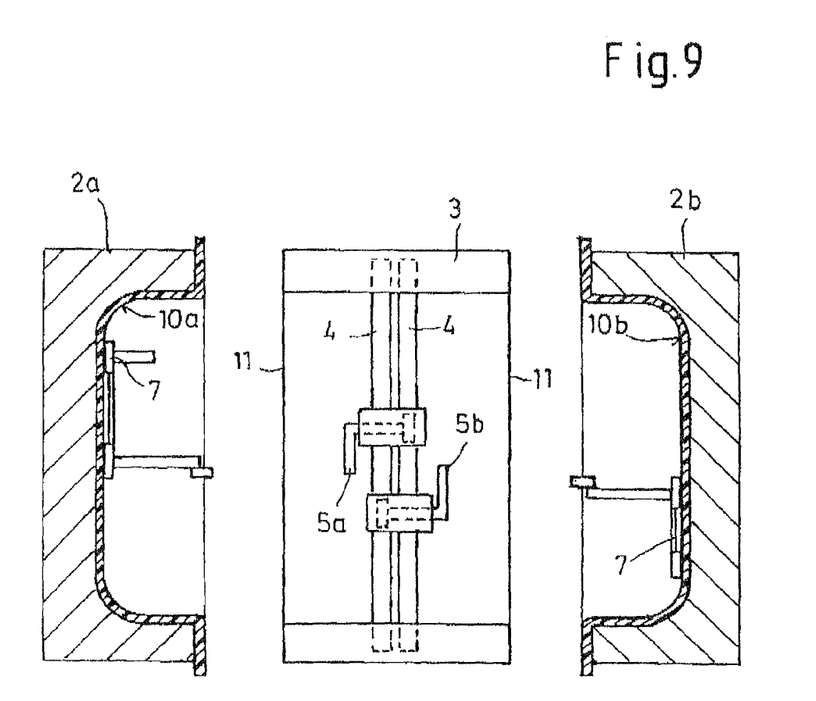

As can be seen in particular from FIG. 7 the carrier 4 is of a two-part configuration, wherein the two parts of the carrier 4 are moved away from each other in a next step in the process, more specifically in the direction of the outer moulds 2a, 2b respectively. The fitment components 7 which are arranged on the component holders 5a, 5b are finally pressed against the inside wall of the shell portions 10a, 10b which are now produced, by actuation of the pneumatic cylinders 6.

There are various possible ways of connecting the fitment components 7 to the inside wall, which is still plastic, of the shell portions 10a, 10b. A force-locking connection and/or a connection involving intimate joining of the materials involved can be envisaged here. A connection by intimate joining of the materials involved is achieved for example by welding the fitment components 7 to the inside wall or also by glueing. As the process according to the invention involves operating in a warmth or in a heat, that is to say the preforms do not experience any further increase in temperature after extrusion until the hollow body is finished, welding is the operation that presents itself.

As can be seen in particular from FIG. 7 the parts of the carrier 4 and the component holders 5a, 5b are positioned in the last phase of fixing the fitment components 7 to the inside wall of the shell portions 10a, 10b, in such a way that the component holders 5a, 5b with the fitment components 7 secured thereto project out of the respective separation plane 11 between the outer moulds 2a, 2b and the central mould 3. In the described embodiment that separation plane 11 is actually illustrated as a plane, but in principle the man skilled in the art also interprets the term 'separation plane' as being a separating surface extending in a spatially complex configuration between the portions of the tool.

Figure 10:
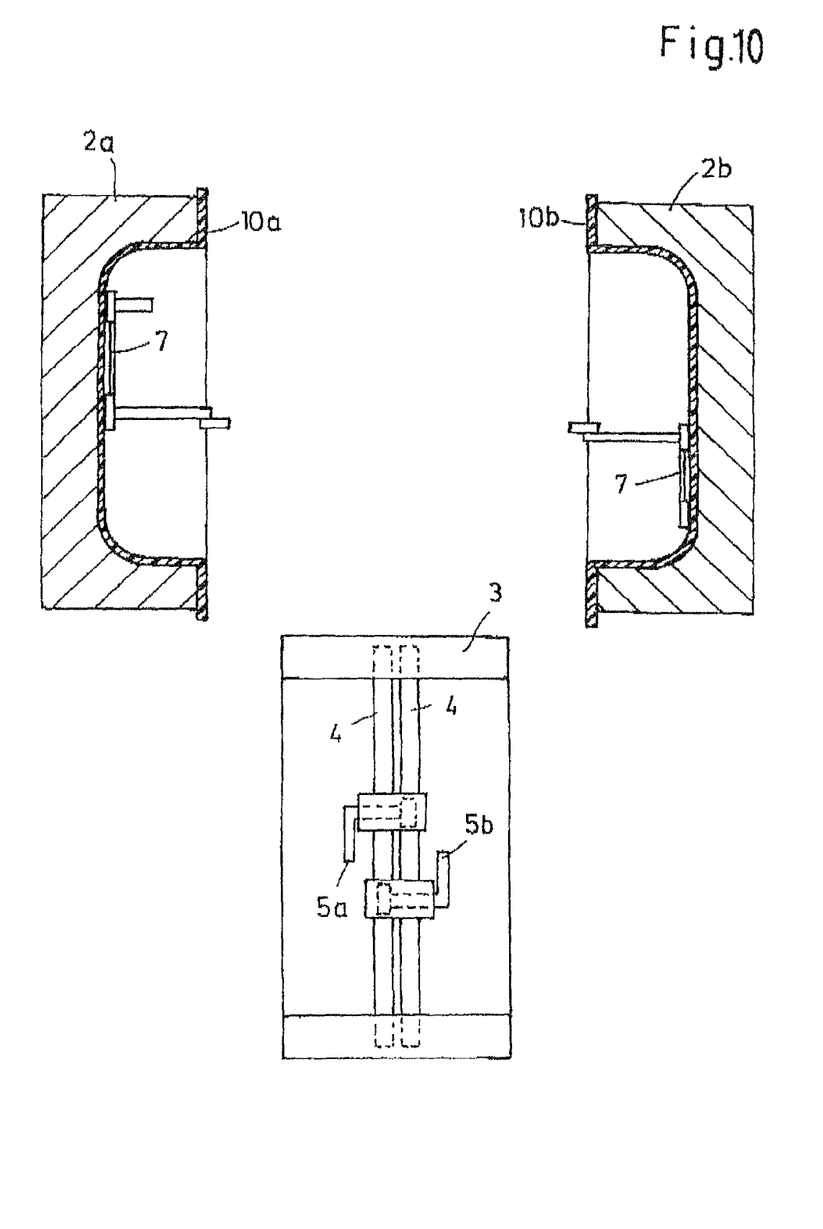
Figure 11:
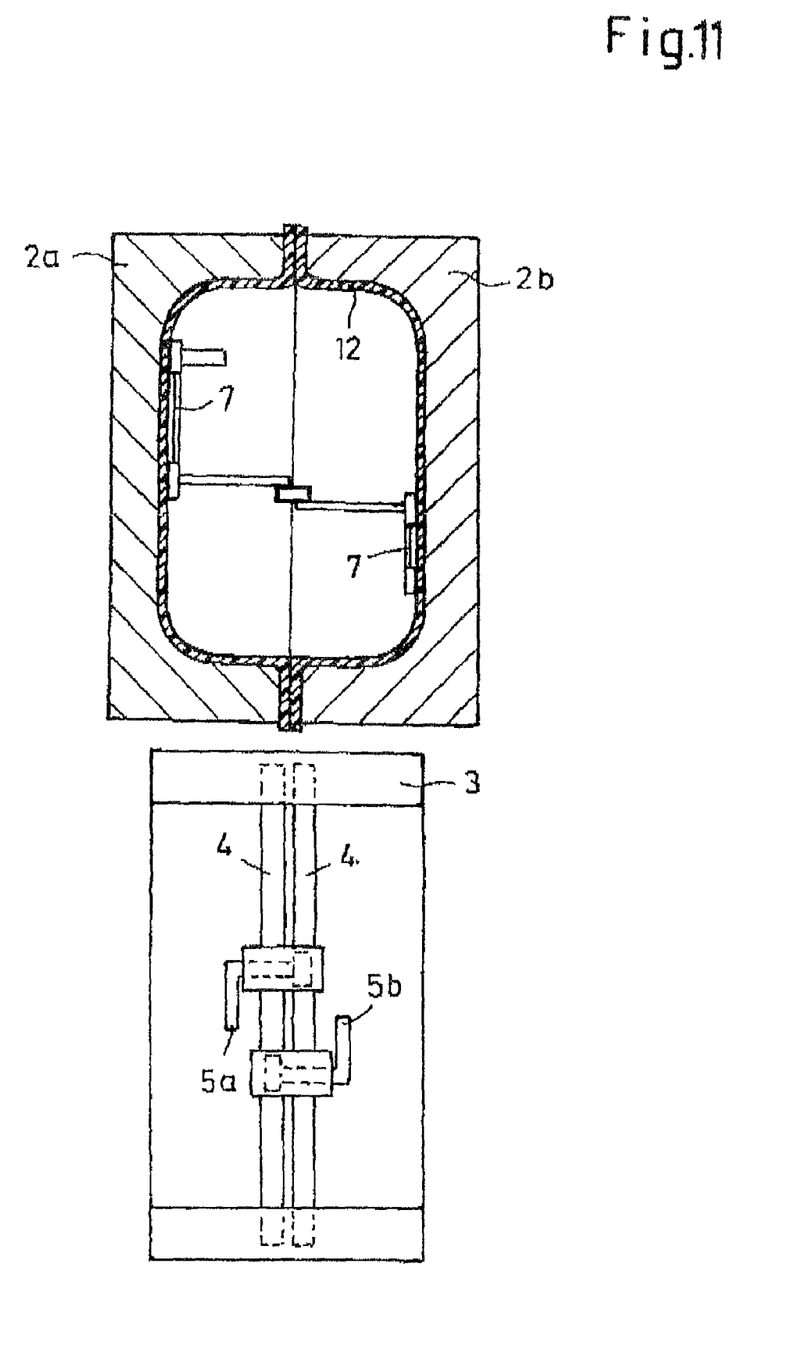

After the parts of the carrier 4 and the component holders 5a, 5b have been moved back into the starting position (FIG. 8) the outer moulds 2a, 2b are opened (FIG. 9) and the central mould 3 is removed or displaced between the outer moulds 2a, 2b (FIG. 10) so that the outer moulds 2a, 2b can unimpededly perform a closing movement towards each other, as is shown in FIG. 11. When the outer moulds 2a, 2b are closed together on the one hand the shell portions 10a, 10b are assembled to form the finished article 12, while on the other hand the fitment components 7 respectively arranged in the shell portions 10a, 10b are brought into operative connecting relationship with each other. That can be effected in various ways, as will be described hereinafter.

Figure 12:
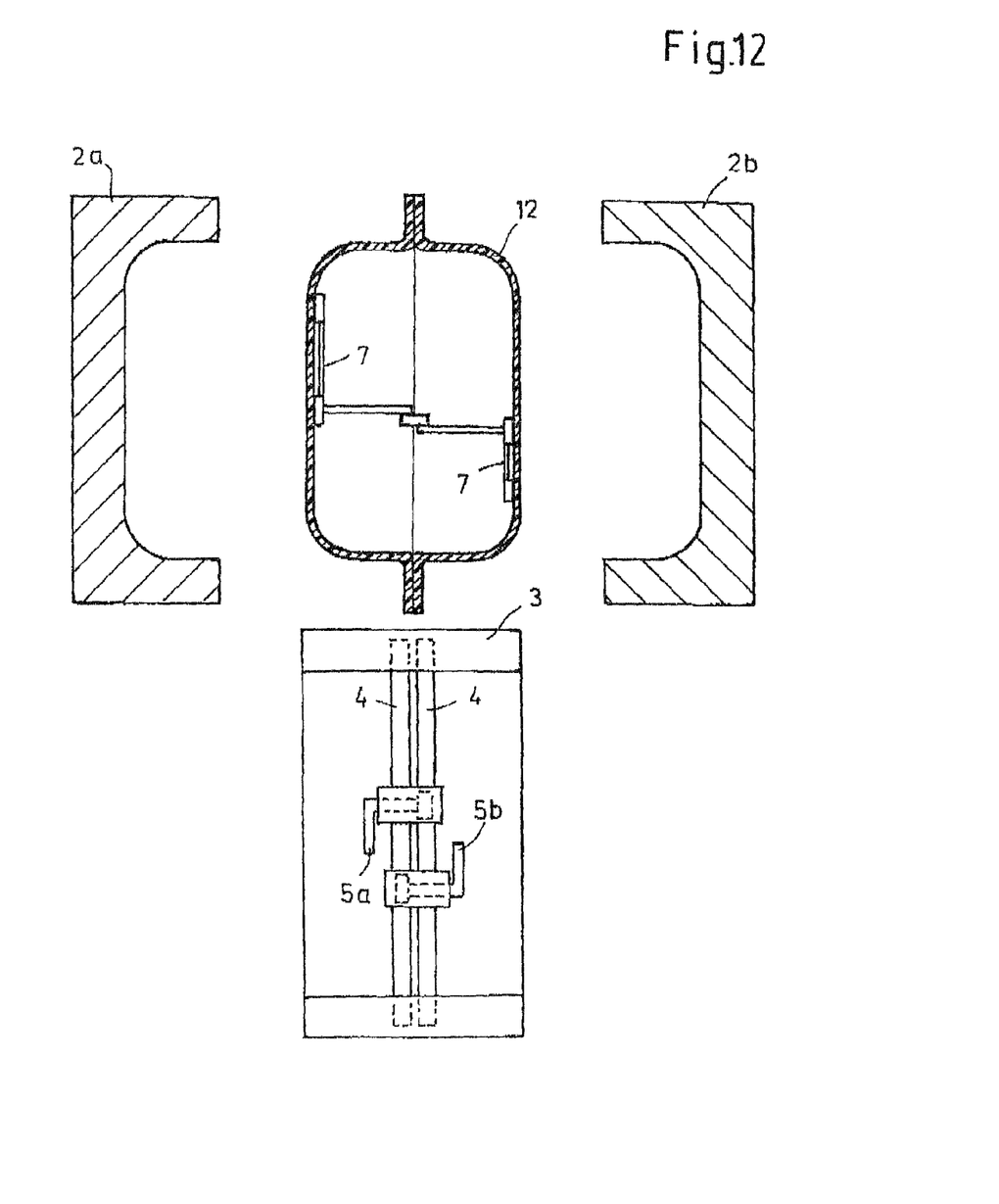

Finally FIG. 12 shows removal of the finished article 12 from the tool 1.

Figure 13:
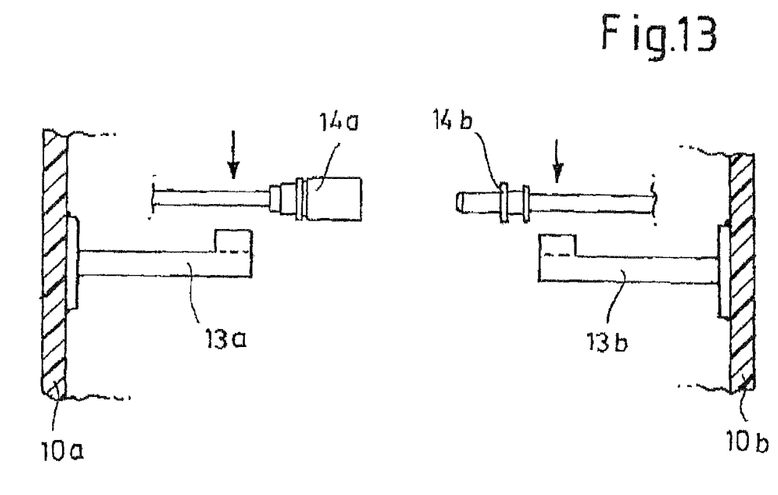
FIGS. 13 and 14 show diagrammatic views of mutually complementary holding elements with couplings accommodated thereby out of engagement and in operative connected relationship with each other.
Figure 14:
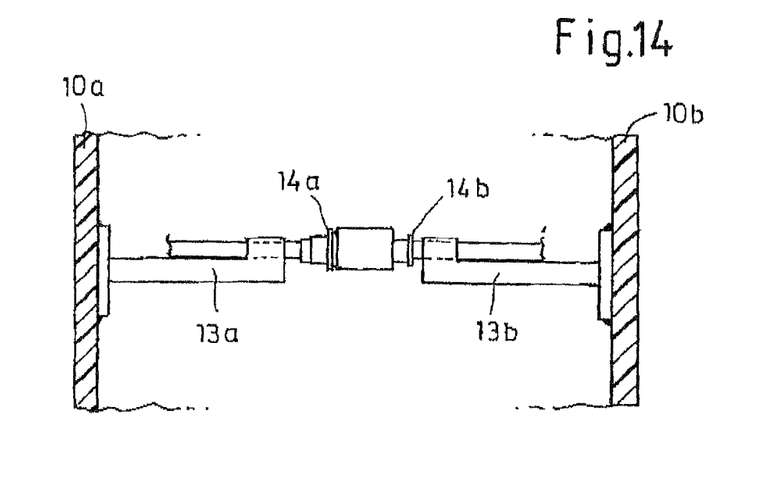

A possible configuration of the built-in fitment components 7 is shown in FIGS. 13 and 14. Mutually complementary built-in fitment components 7 illustrated there are in the form of holding elements 13a, 13b which are each placed on the inside wall of the respective shell portions 10a, 10b in accordance with the above-described procedure, wherein the holding element 13a receives the coupling 14a and the holding element 13b receives the plug 14b of a line connection. Both the coupling 14a and also the plug 14b are arranged on the holding elements 13a, 13b in such a way that the coupling 14a and the plug 14b are brought into engagement with each other when the outer moulds 2a, 2b are brought together (FIGS. 10 and 11). It will be apparent to the man skilled in the art that for that purpose it is necessary for the holding elements 13a, 13b or the fitment components 7 to be placed in the shell portions 10a, 10b in such a way that it is possible to produce an operatively connected relationship therebetween when the outer moulds 2a, 2b are moved together. The parts which are to be connected together must also have suitable tolerances, as will be clear for example by reference to the embodiment shown in FIGS. 15 and 16.

Figure 15:
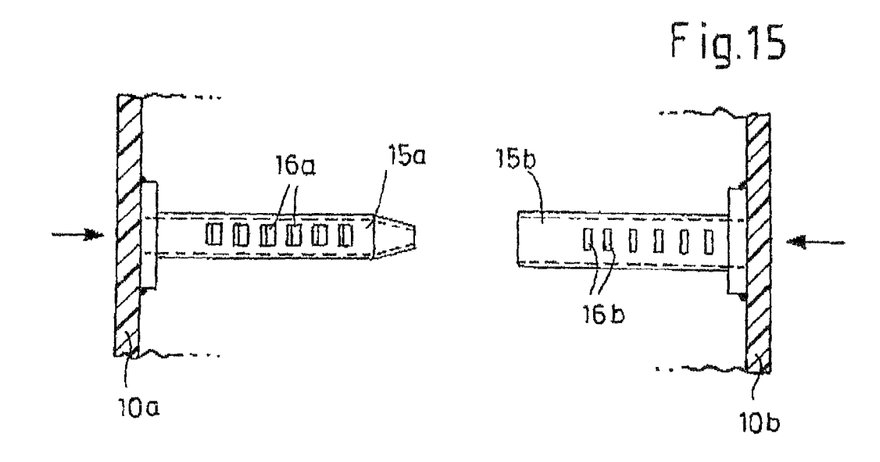
FIGS. 15 and 16 show a tie anchor comprising two mutually complementary elements which are brought into engagement with each other when the mould is closed when the shell portions are brought together.
Figure 16:
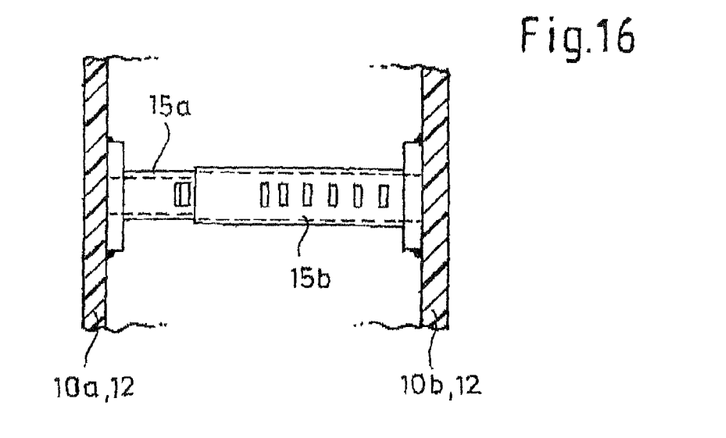

The built-in fitment components 7 shown in FIG. 15 represent a tie anchor comprising a latching projection 15a and a sleeve-shaped latching receiving means 15b. The latching projection 15a is provided with latching protrusions 16a whereas the latching receiving means 15b has corresponding latching openings 16b. In production of the hollow body the two parts of the tie anchor are positioned or placed relative to each other on the inside wall of the respective shell portions 10, 10b in such a way that they are arranged in exactly opposite relationship. When the outer moulds 2a, 2b are closed against each other, the latching projection 15a engages into the oppositely disposed latching receiving means 15b and the latching protrusions 16a are locked in the latching openings 16b of a corresponding configuration. See FIG. 16. In that way the shell portions 10a, 10b which represent the mutually oppositely disposed walls of the finished container are non-releasably braced together.

REFERENCE NUMERALS 1 tool
2a, 2b outer moulds
3 central mould
4 carrier
5a, 5b component holder
6 pneumatic cylinder
7 built-in fitment components
8 preforms
9a, 9b sub-cavities
10a, 10b shell portions
11 separation plane
12 article
13a, 13b holding elements
14a coupling
14b plug
15a latching projection
15b latching receiving means
16a latching protrusions
16b latching openings

What is claimed is:

1. A process for the production of a hollow body of thermoplastic material for the production of a fuel tank of plastic material, comprising the steps of:

providing one or more heated preforms in web or band form of plasticized plastic material;

providing a multi-part tool forming a mould cavity having an internal contour;

shaping said one or more preforms in said multi-part tool by expansion of said one or more preforms thereby causing said preforms to bear against the internal contour of the mould cavity to form two mutually complementary intermediate products in the form of shell portions which face towards each other in the tool;

providing at least one respective built-in fitment component capable of being secured to respective insides of the shell portions, wherein at least some of said built-in fitment components are respectively of mutually complementary configuration;

securing said at least one respective built-in fitment component to said respective inside wall of said shell portions while the shell portions face towards each other in the tool;

assembling said shell portions while the shell portions face towards each other in the tool in such a manner that said mutually complementary built-in fitment components engage into each other and/or come into operative connecting relationship with each other such that said mutually complementary built-in fitment components are joined to provide an assembled component or to provide a functional unit;

wherein bracing strut elements for stabilising the hollow body are used as the mutually complementary built-in fitment components, the bracing strut elements having a configuration to lock each other together when the half-shell portions are joined together, and having a configuration to counteract deformation of the hollow body due to an increase in pressure within the hollow body;
wherein said bracing strut elements comprise a latching projection within a latching receiving means;
wherein said latching projection includes at least one protrusion located along an axial length of said latching projection;
wherein said latching receiving means includes at least one opening located along an axial length of said latching receiving means to receive the at least one protrusion; and
wherein said at least one protrusion is located in said at least one opening to lock the latching projection and latching receiving means together.

2. The process according to claim 1 wherein the steps of providing and shaping the preforms and assembling the shell portions are performed without further heating of the performs after the performs are shaped to form the two mutually complementary intermediate products in the form of the shell portions which face towards each other in the tool.

3. The process according to claim 1 characterised in that the preforms are shaped in a multi-part mould tool which includes at least two outer moulds and at least one central mould which perform an opening and closing movement relative to each other, wherein the outer moulds respectively form sub-cavities which predetermine the contours of the shell portions and the central mould is provided with at least one component holder, by way of which some of the fitment components are placed at the insides of the shell portions, after the operation of shaping the shell portions.

4. The process according to claim 3 characterised in that the central mould is removed after placement of some of the built-in fitment components between the outer moulds and then the outer moulds are closed against each other in such a way that the shell portions and at least some of the fitment components arranged therein come into operative connecting relationship with each other.

5. The process according to claim 1 wherein said bracing strut elements comprise a tie anchor.

6. The process according to claim 1 wherein said latching projection includes a plurality of protrusions located along an axial length of said latching projection and said latching receiving means includes a plurality of latching openings located along an axial length of said latching receiving means to receive the plurality of protrusions.

7. The process according to claim 6 wherein each protrusion of said plurality of protrusions is located in a corresponding opening of said plurality of openings to receive the plurality of protrusions.

8. The process according to claim 1 wherein said lock is non-releasable.

9. The process according to claim 7 wherein each protrusion of said plurality of protrusions located in a corresponding opening of said plurality of openings locks the latching projection and latching receiving means together.

10. The process according to claim 1 wherein said hollow body comprises a six layer co-extrudate.

11. The process according to claim 1 wherein said step of assembling the shell portions comprises welding of said shell portions together to form said hollow body.

* * * * *

UNITED STATES PATENT AND TRADEMARK OFFICE
CERTIFICATE OF CORRECTION

PATENT NO. : 8,329,082 B2  
APPLICATION NO. : 12/897925  
DATED : December 11, 2012  
INVENTOR(S) : Borchert et al.

Page 1 of 1

It is certified that error appears in the above-identified patent and that said Letters Patent is hereby corrected as shown below:

In the Claims

In column 8, line 13, in claim 6, after "of" delete "latching".

Signed and Sealed this  
Seventh Day of May, 2013

Teresa Stanek Rea  
*Acting Director of the United States Patent and Trademark Office*